United States Patent [19]

Ortel

[11] Patent Number: 5,861,966
[45] Date of Patent: Jan. 19, 1999

[54] BROAD BAND OPTICAL FIBER TELECOMMUNICATIONS NETWORK

[75] Inventor: William G. Ortel, New York, N.Y.

[73] Assignee: NYNEX Science & Technology, Inc., White Plains, N.Y.

[21] Appl. No.: 579,388

[22] Filed: Dec. 27, 1995

[51] Int. Cl.[6] .................................................. H04J 14/02
[52] U.S. Cl. ......................... 351/125; 359/118; 359/133
[58] Field of Search .................................. 359/118, 124, 359/125, 120, 121, 133

[56] References Cited

U.S. PATENT DOCUMENTS

| | | | |
|---|---|---|---|
| 4,555,810 | 11/1985 | Khoe et al. ............................... | 359/118 |
| 4,860,287 | 8/1989 | Kelly ........................................ | 370/108 |
| 5,153,762 | 10/1992 | Huber ...................................... | 359/125 |
| 5,221,983 | 6/1993 | Wagner .................................... | 359/124 |
| 5,272,556 | 12/1993 | Faulkner et al. ........................ | 359/125 |
| 5,337,175 | 8/1994 | Ohnsorge et al. ....................... | 359/121 |
| 5,357,360 | 10/1994 | Imhoff et al. ............................ | 359/125 |
| 5,384,651 | 1/1995 | Van De Voorde et al. ............. | 359/152 |

FOREIGN PATENT DOCUMENTS

| | | | |
|---|---|---|---|
| 0436820 | 7/1991 | European Pat. Off. ................ | 359/121 |
| 9109478 | 6/1991 | WIPO ...................................... | 359/125 |

*Primary Examiner*—Leslie Pascal
*Attorney, Agent, or Firm*—Robin, Blecker & Daley

[57] ABSTRACT

A broadband optical fiber network for conveying signals between subscriber locations and a head end. A coherent light source is used at the head end to generate signals for transmission to the subscriber locations. Successive groups of downstream optical transmission segments followed by optical separators or splitters carry the coherent light from the head end to the subscriber locations. Non-coherent light sources providing broadband optical signals are situated at the subscriber locations. Successive groups of upstream optical transmissions segments followed by optical combiners carry the broadband optical light signals to the head end.

8 Claims, 8 Drawing Sheets

BROAD BAND OPTICAL FIBER TELECOMMUNICATIONS NETWORK

BACKGROUND OF THE INVENTION

The present invention relates to telecommunications networks, particularly to fiber optic transmission of broadband signals, including voice telephony, in a single network.

Such systems are rapidly being installed worldwide because of fiber optic's advantages as a transmission medium, greater bandwidth and noise characteristics, as well as cost when compared to metal conductor based media. They allow the distribution to customers of both voice grade telephony and broadband services, such as CATV over the same network infrastructure.

Examples of such systems are discussed for example in an article by Don McCullough of Broadband Technologies, Inc., Research Triangle Park, N.C., entitled The Raging Technology Debate: Hybrid Fiber/Coaxial Cable vs. Fiber to the Curb, Lightwave Magazine, July 1995, pp. 36, 39, and 41.

The network types compared by McCullough, Hybrid Fiber Coax (HFC) and Fiber to the Curb (FTTC), are alike in that they employ fiber optic transmission between a central location and an intermediate node, where signals are interconverted betweeen optical and electrical form so that further transmission to and from customers is electrical. The systems differ in the distance of fiber transmission: For HFC, the fiber transmission links extend only to nodes that serve clusters of 500 to 2500 customers, while, for FTTC, the fiber links extend further, to clusters of 8 to 24. Because of this difference, the FTTC system can employ lower-cost twisted copper pair wiring between the intermediate node and the customer, while the electrical transmission medium used in the HFC system is coaxial cable.

The networks discussed by McCullough are also alike in that separate fiber links are employed for the analog radio-frequency (RF) television signals that are broadcast to customers and for the telephony signals. The analog fiber links are unidirectional, while the telephony links are bidirectional. The telephony signals are digitally encoded and multiplexed over fiber links that include optical modulators and detectors that are more expensive than those used for analog video. For the HFC system, the digital telephony signals are also transmitted over the coaxial cable portion of the network bidirectionally by digitally-modulated RF carriers.

Another type of broadband system that combines the transmission of telephony and analog video is disclosed by Beierle et al. in U.S. Pat. No. 5,351,234. This system has a basic advantage over the systems described above in not requiring any signal processing at an intermediate node in the network. If desired, the subscriber interface unit could serve a cluster of subscribers, but it need not serve more than one.

As therein described, this system employs bidirectional transmission on coaxial cable; it uses the same analog RF modulation technique as broadcast analog video. As shown by the invention such systems may advantageously be adapted to include at the central location fiber-optic links of the sort used for video in the systems discussed by McCullough; these would of course have to be bidirectional. This adaptation would introduce an intermediate node into the network, but no telephony signalling or multiplexing function would be performed there, only simple optical amplitude modulation and demodulation. It has the advantage over the HFC systems described above in not requiring separate fiber links for telephony. The reduced complexity leads to lower cost.

Nonetheless, as telecommunications becomes more competitive, it remains important to further reduce costs, particularly in all-fiber networks.

SUMMARY OF THE INVENTION

The present invention offers further advantages over the prior art in that it allows use of less expensive transmission equipment at the subscriber end, where much of the network cost is located. More particularly, the invention contemplates a network configuration allowing for inexpensive non coherent light sources at the subscriber end for the return path instead of much more expensive coherent laser light sources. Additionally, the invention allows analog modulation of the transmitting light sources at both the head end and at the subscriber location. The laser equipment at the head end should be less costly than for the digital case. Moreover, the subscriber modulator and head end demodulator need no longer be matched pairs.

Thus, the invention has as its object to achieve component cost savings while allowing the benefit of optical fiber bandwidth advantages direct to the subscriber.

A further object of the invention is to provide such a network employing inexpensive non-coherent light sources such as light emitting diodes (LED's) rather than a (coherent) laser for the return path from the subscriber.

A yet further object of the invention is to exploit the availability of direct optical amplifiers to enable use of less powerful and less costly light sources in the return path.

Another object is to minimize network cost by placing such amplifiers at an intermediate node, such as at a neighborhood equipment subgroup, so that the equipment at the subscriber location can be kept as inexpensive as possible.

BRIEF DESCRIPTION OF THE DRAWINGS

These and other objects of the invention may be understood from the following detailed description of preferred embodiments including the appended drawings. With respect to the latter.

DETAILED DESCRIPTION

Optical technology is coming into widespread use for transmitting telephone and television signals. For example, many operators of cable television systems have installed analog fiber optic links instead of coaxial cable. In contrast to the coaxial cable, there is negligible attenuation in the fiber, so that amplifiers are needed mainly to make up for power losses in combining and splitting networks. Fewer amplifiers are needed, improving the network reliability and maintenance cost, and amplifiers can be placed where it is most convenient for system design and operation, rather than at fixed spans dictated by attenuation. Since the transmission bandwidth of the fiber itself is extremely large, a fiber network has an extensive potential for the addition of future services.

However, electro-optical conversion devices, particularly transmitters or modulators, are expensive. Hence, optical links are generally used only where they can carry a large number of signal channels. In a transmission network such as would be suitable for the technology that is the subject of U.S. Pat. No. 5,351,234, it would generally be expected that optical transmission would be used only in place of the primary coaxial, or trunk, portion. It therefore, has not generally been believed to be practical to extend fiber all the way to the customer. The feeder coaxial and coaxial customer connection portions thus become bandwidth bottlenecks.

To solve this, nodes are introduced into the network at "neighborhood" locations where channels from 100 or so customers may be combined. All channels are combined at a central location where the optical network is connected to broadband channels of switching and multiplexing equipment. The channels to the customer from the node would be coax and the trunking to the head end would be fiber. These are called hybrid fiber coax (HFC) networks.

The invention proposes to generally adopt this topology using customer line concentration at nodes, but in an all-fiber system. In the invention, a high power, wide bandwidth, optical transmitter at the central location sends signals "forward" to customers using a modulation scheme that permits relatively simple demodulators. Lower power, narrower bandwidth optical transmitters at customer locations send "return" signals to the neighborhood nodes, where they are combined, amplified and/or remodulated for transmission to the central location.

A suitable central transmitter would be an amplitude-modulated laser with a modulation bandwidth of 500 to 1000 MHz. A suitable customer demodulator would be a solid-state avalanche photodiode. A suitable customer transmitter would be a lightemitting diode ("LED") having a modulation bandwidth less than 100 MHz but emitting a noncoherent carrier with a linewidth of 20 to 40 nanometers. A suitable amplifier at neighborhood locations would be an Erbium Doped Fiber Amplifier ("EDFA") which provides gain for substantially all the wavelengths emitted by the LED. Multimode transmission would be suitable for the fiber leading from the LED. Suitable carrier wavelengths would be 1310 nanometers for forward transmission and 1550 nanometers for return.

Figure 1:
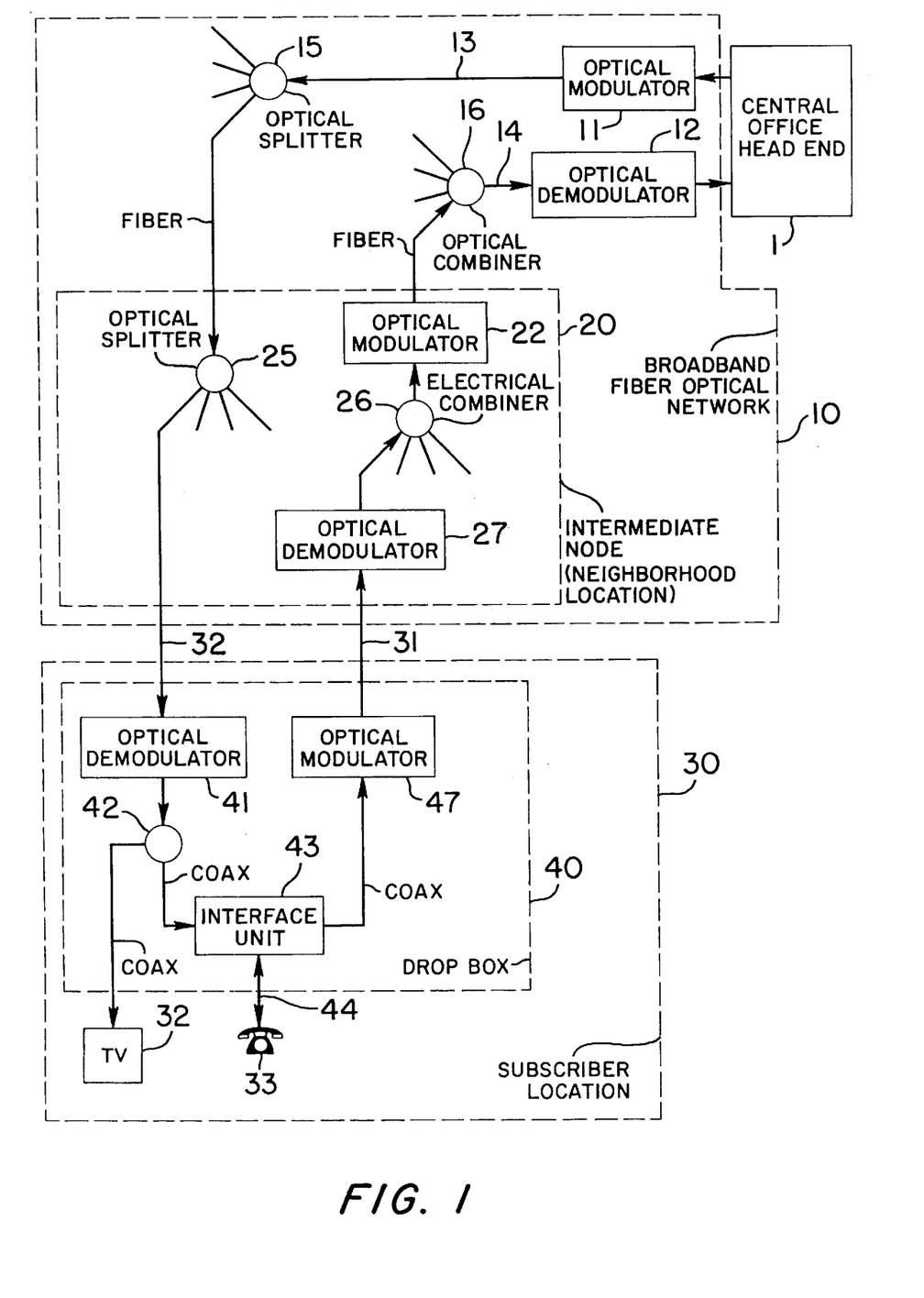
FIG. 1 represents an optical fiber network designed to replace metal conductor hybrid networks according to the principles of the present invention.

FIG. 1 shows how a broadband optical fiber network can be used for transmission in place of a coaxial cable network for systems of the sort described in U.S. Pat. No. 5,351,234. A key objective in such a system is low cost, since the electronic elements in a coaxial network, trunk and feeder amplifiers, can cost as little as $10 per subscriber port. Hence, it is important to use the lowest cost optical technology and to place the most expensive optical components where they can be shared by as many subscribers as possible.

In FIG. 1 there is a broadband fiber optical network equipment group 10 and a subscriber location equipment group 30. The network equipment group contains an intermediate node equipment subgroup 20 as well as fiber trunks 13, 14 for downstream transmission and return respectively, and complementing optical modulators and demodulators 11 and 12 interfacing electrically with the central office 1. On the transmit side 13 there is an optical splitter 15 to divide signals to each of several intermediate nodes 20 and on the return side 14 a complementary equivalent optical combiner 16.

In the intermediate nodes 20, optical demodulator 27 receives the return signal from return'side fiber dropline 31 from a subscriber location 30. Combiner 26 receives the output of several such demodulators 27, each of the latter corresponding to one of several subscriber locations 30. Optical splitter 25 provides transmission side distribution to each subscriber location 30 over transmission fiber dropline 32.

Subscriber location 30 contains the subscriber in-premises equipment usually comprising a normal telephone 33, a broadband device such as a television receiver 32, each receiving electrical input signals that are provided by dropbox equipment 40.

The drop-box equipment 40 includes an optical demodulator 41 to receive signals from the network 10 via the neighborhood equipment group 20 and filter 42 to split off the non-telephone portion of the modulated signal received from the network. Interface unit 43 receives the telephone signal portion and converts it to the base band suitable for telephone device 33 and transmits on copper pair 44. On the return side interface unit 43 upconverts to the necessary return voice signal intermediate frequency and optical modulator 47 converts to the appropriate modulation scheme used for retransmission in the fiber network.

In this system, the optical modulator 11 and demodulator 12 at the interface with the broadband channels are shared with all subscribers and can be relatively expensive without contributing too much to the cost per subscriber. If possible, the modulator 11 should produce enough optical power that the signal ultimately received at a subscriber location can be demodulated with a relatively simple demodulator. If possible, this path should not include amplifiers, for cost and network reliability, and therefore none are shown.

Figure 2:
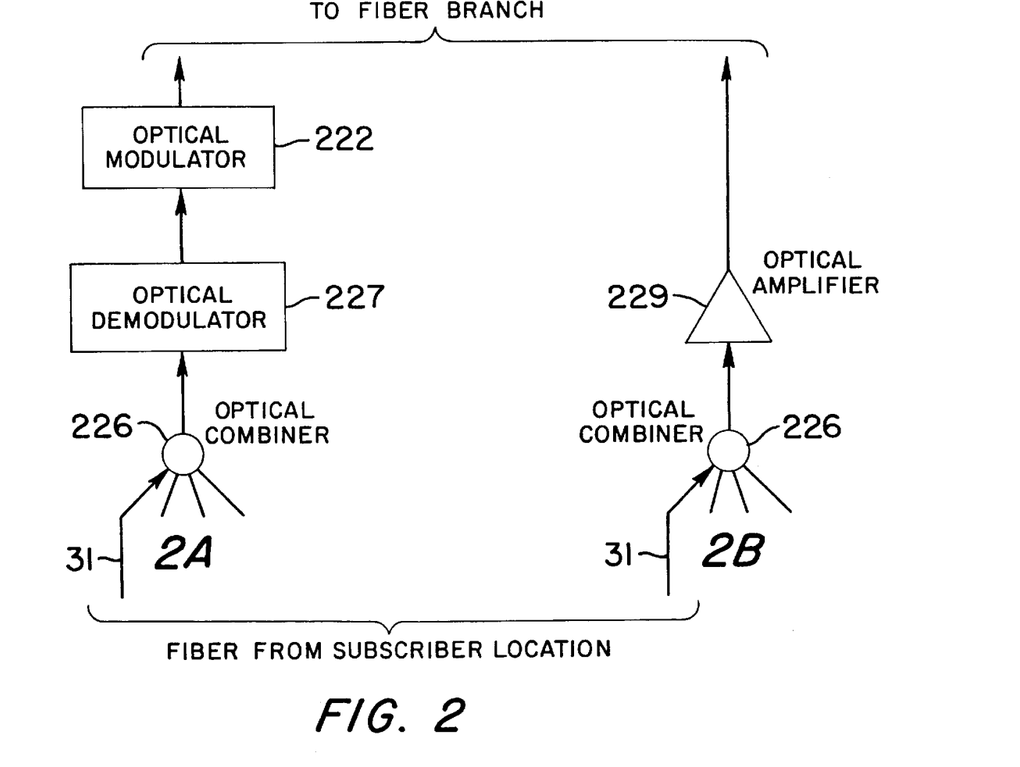
FIG. 2 represents the network segment which is included in the return path at the intermediate node, such as a dropbox and which shows the use of an optical amplifier in the return path.

In the path from the subscriber, there is a relatively inexpensive modulator such as an LED. As shown, the signals from a number of subscriber locations are combined as "neighborhood" location 20, where there is a more expensive modulator whose cost can be shared. Alternative arrangements of elements in the return path at the neighborhood location 20 are shown in FIG. 2.

In FIG. 2A, the optical combiner 226 can be transposed with the demodulator 227 when compared with demodulator 27 and electrical combiner 26 of FIG. 1. If it is necessary to provide gain in the forward direction, this could preferably be done by inserting an optical amplifier 229 after the optical splitter at the neighborhood location. In FIG. 2B optical amplifier 229 replaces optical demodulator/modulator pair 227-222 of FIG. 2A.

Further economies would result from sharing the drop box 40 among several subscribers.

Figure 3:
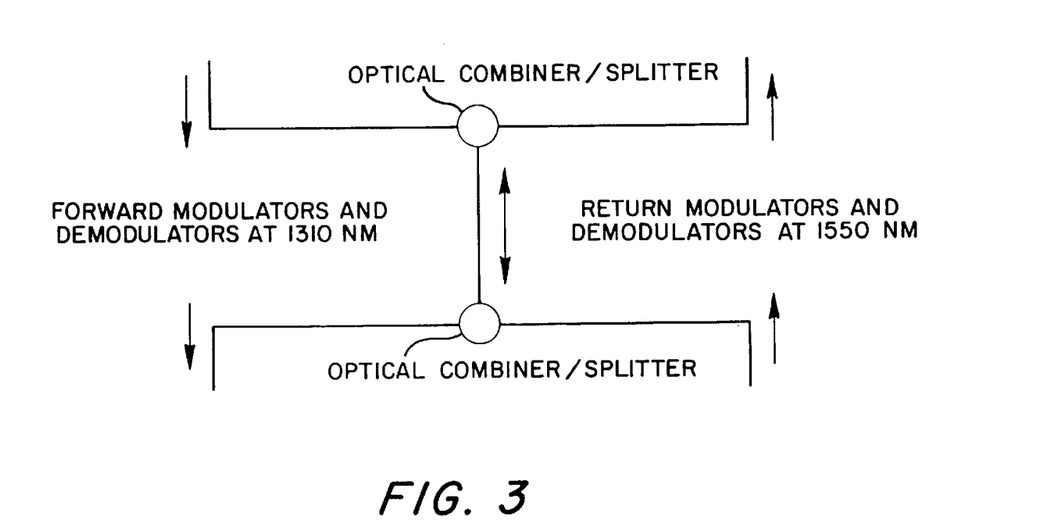
FIG. 3 shows a wavelength modulation scheme which may be used to implement the proposed network.

While the figures show a two-fiber transmission scheme, it would be possible to use a single fiber with wavelength multiplexing per FIG. 3. The lines represent fiber channels and the arrows direction of propagations (such an arrangement could be substituted between amplifiers 829a/829b and laser 803 detector 802 in FIG. 8.)

The system of FIG. 3 takes advantage of the fact that the requirements for transmission in the forward and return directions are quite different. In the forward direction, a bandwidth of 500 to 1000 MHz, needed for a large number of 6 MHz channels for both TV and telephony, is provided using a single relatively expensive optical modulation. In the return direction, only a few 6 MHz channels are needed for telephony, but there are many modulators. In spite of the fact that LED's are limited to modulation bandwidth less than 100 MHz, and are noncoherent, they are an adequate low-cost solution for the subscriber-to-neighborhood link in the system. Appropriate low-cost demodulators for this link would be PIN photodiodes, for example operated in avalanche mode.

This system can use the recently introduced optical amplifiers that use erbium-doped optical fiber, pumped with a diode laser (EDFA). These are conventionally used with laser sources. According to the invention they may be used with LED sources. Even though the EDFA can handle a modulation bandwidth much greater than the LED can provide, the devices are well matched in that the noncoherent spectrum of the LED can be coupled efficiently to the EDFA: both devices cover perhaps 30 nm at 1550 nm. The requirements for using an EDFA with an LED are less stringent than for a laser, leading to possible development of even more lower cost EDFA's.

Figure 4:
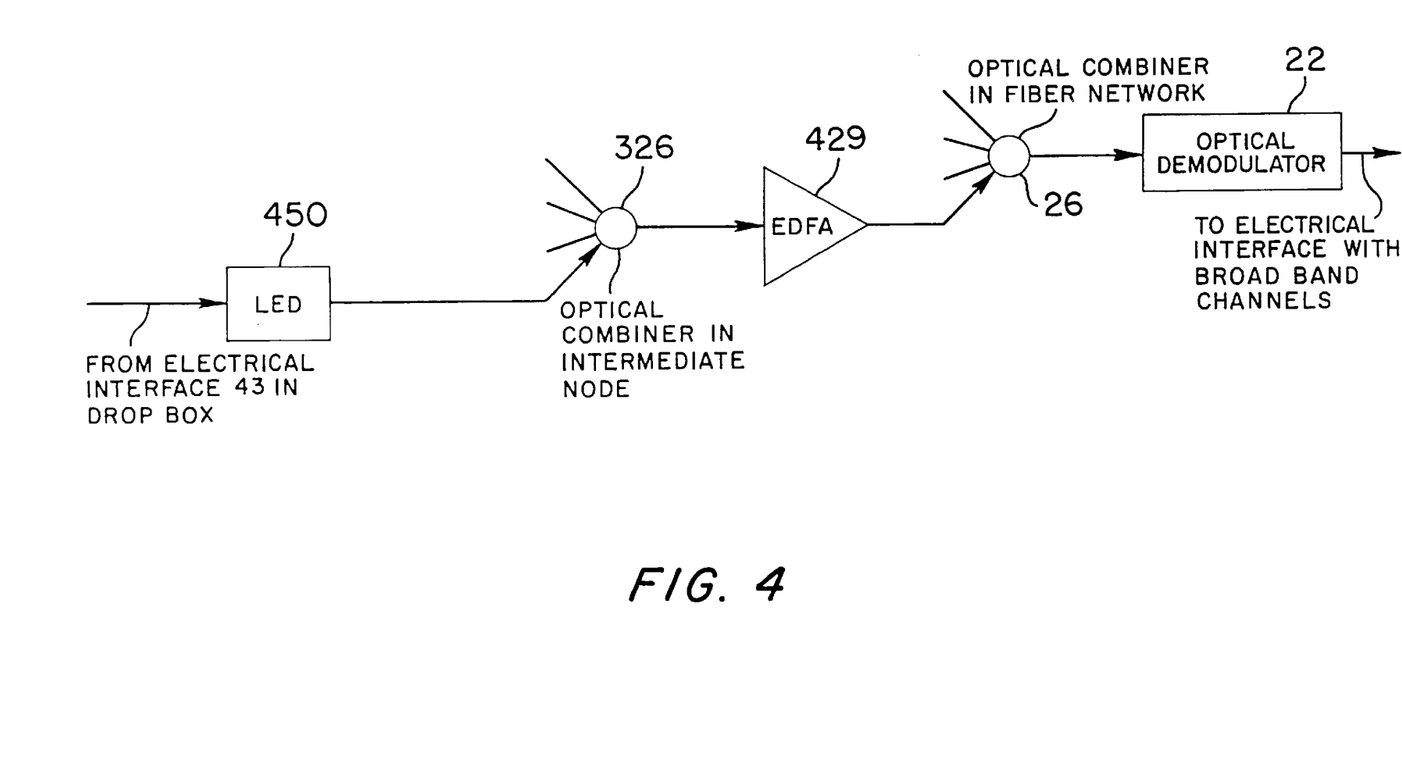
FIG. 4 shows the overall fiber link using noncoherent light sources from the subscriber end to the central switching point (corresponding to the central office in traditional metal conductor based telephony).

With respect to the system of FIG. 1, employing the technique of FIG. 3, the overall noncoherent fiber return link from the subscriber would be as per FIG. 4.

In FIG. 4 the return signal from subscriber interface (443 in drop-box 40) is optically transmitted by an appropriate LED to optical combiner 326 (corresponding to 226 in FIG. 2) in the neighborhood equipment subgroup 20 configured as per FIG. 2. Optical EDFA amplifier 429 amplifies that signal, which is in turn optically transmitted to network optical combiner 26 which concentrates neighborhood (multiplexed) signals and provides them to optical demodulator 22 for manipulation by the central office/head end.

Figure 5A:
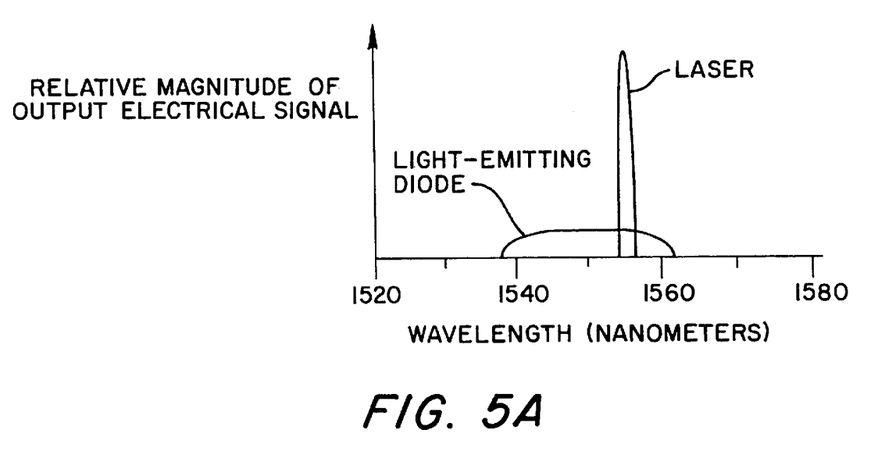
FIG. 5A shows the comparative spectral sensitivity of LED vs. laser light sources and FIG. 5B that of a semiconductor diode detector for the LED source.
Figure 5B:
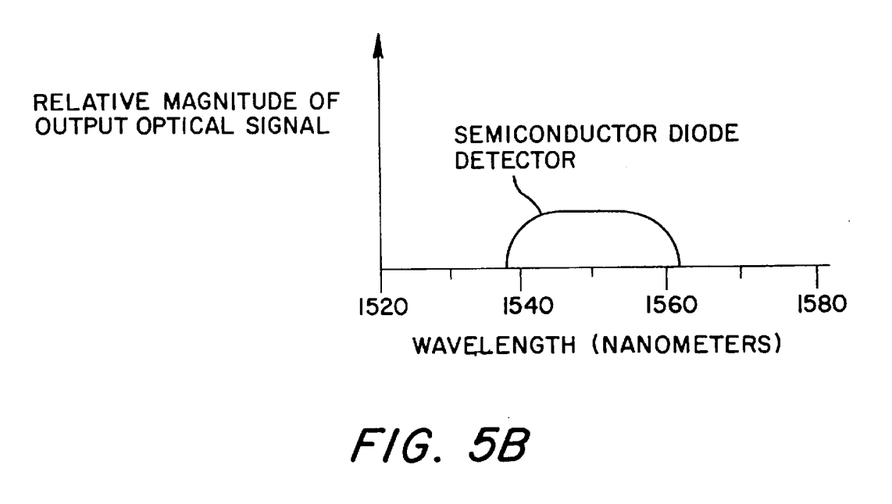

FIGS. 5A and 5B respectively show example spectral characteristics for the non-coherent LED light source emitters and for the semiconductor diode detectors previously discussed; as can be seen they should be approximately matched in spectral characteristics, for comparison purposes a coherent laser spectrum is also shown in FIG. 5A.

Figure 6:
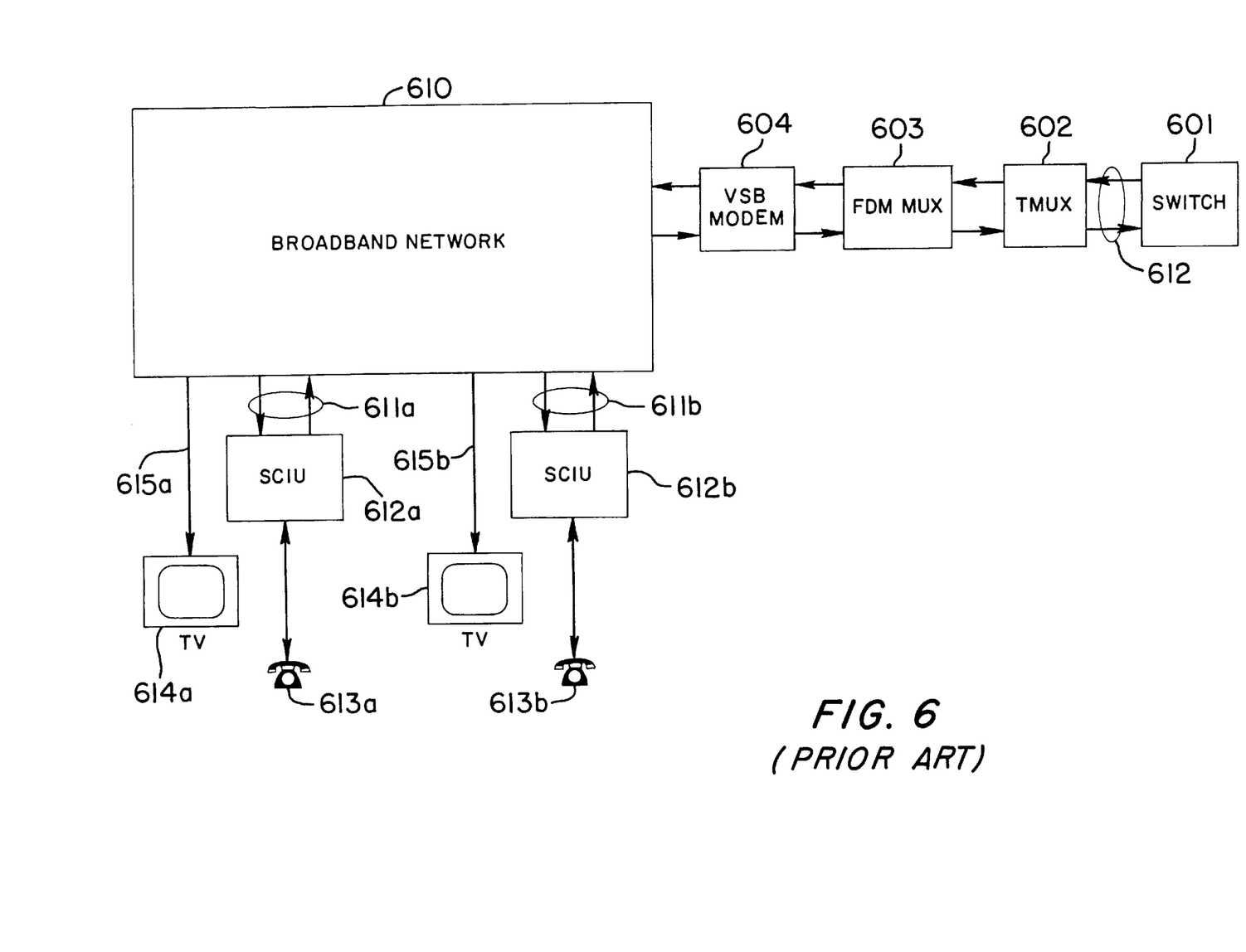
FIG. 6 shows an integrated CATV and telephone distribution network discussed in U.S. Pat. No. 5,351,234 to Beierle et al.

FIG. 6 illustrates a broadband (metal) coax based network arrangement discussed in U.S. Pat. No. 5,351,234. As discussed in that patent, in that network, switch 601 is located at a central office type switching center. Transmultiplexer 602 converts from TDM modulation present on distribution network 612 for more efficient use of TDM type switching arrangements; FDM MUX 603 and vestigal sideband modem 604 convert signals to VSB FDM format for network transmission via network 6110. Subscriber-Cable interface units (SCIU's) 612a, b . . . n interface telephones 613a, b . . . n to the network 610 via respective droplines 611a, b . . . n while television receivers 614a, b . . . n are connected to the broadband network 610 by coax lines 615a, b . . . n respectively. In the '234 patent, the SCIU's are referred to as "drop boxes" because they include all the equipment needed to connect a subscriber's telephone to a coaxial drop cable. Further, in the '234 patent, the term "Broadband Network" is used to include the Broadband Network 610 as well as VSB modem 604.

Figure 7:
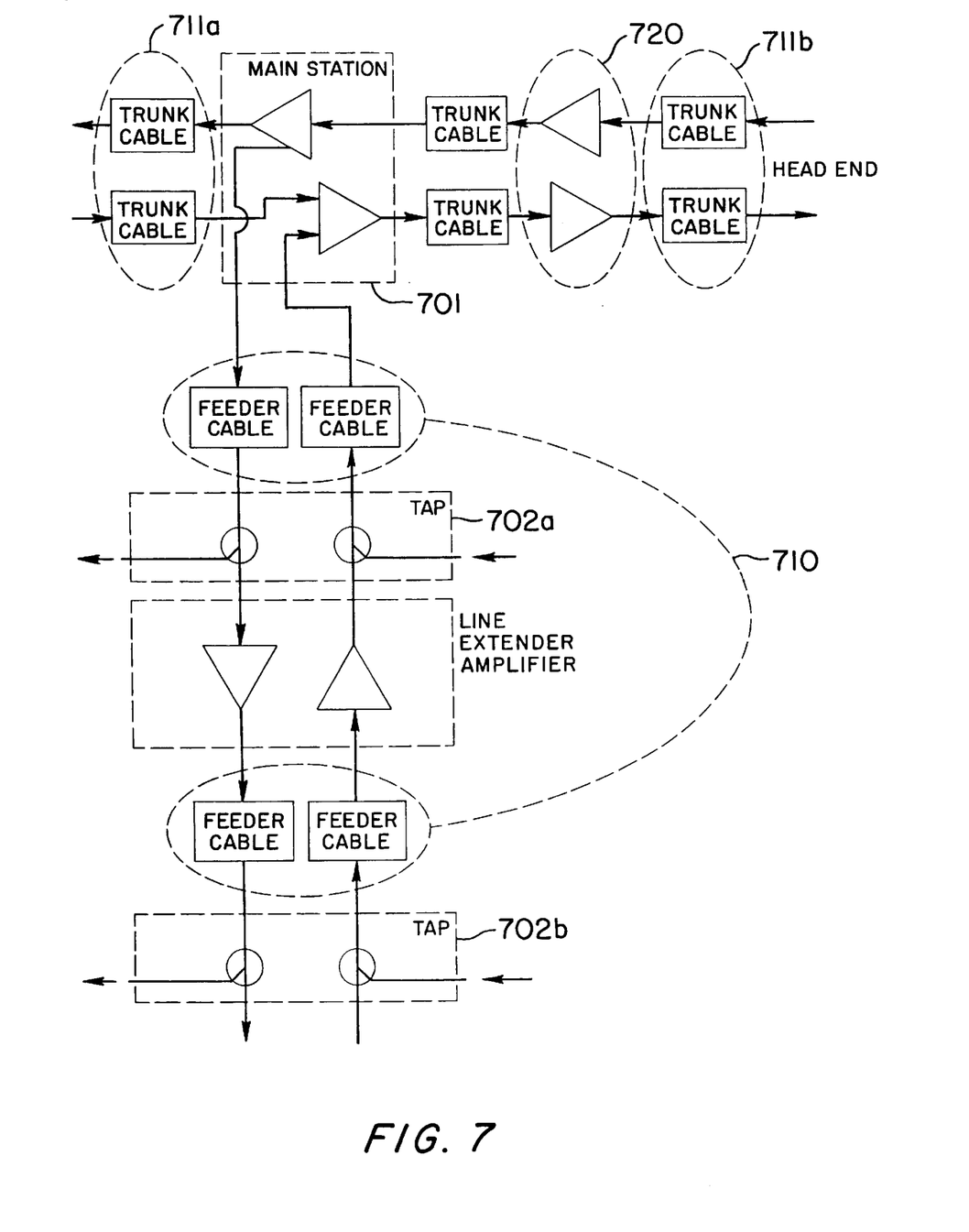
FIG. 7 shows a two-way dual coaxial cable (metal) network involving trunking from the central office.

FIG. 7 shows an implementation of broadband network 610 of FIG. 6. Taps 702a, b . . . n distribute combined (voice & video) broadband to the customer location from feeder cable 710 from main station 701. In these networks trunk cables 711a, b . . . n interconnect mainstations and head ends. Such cables also usually require amplifier pairs 720, as do the feeder cables.

Figure 8:
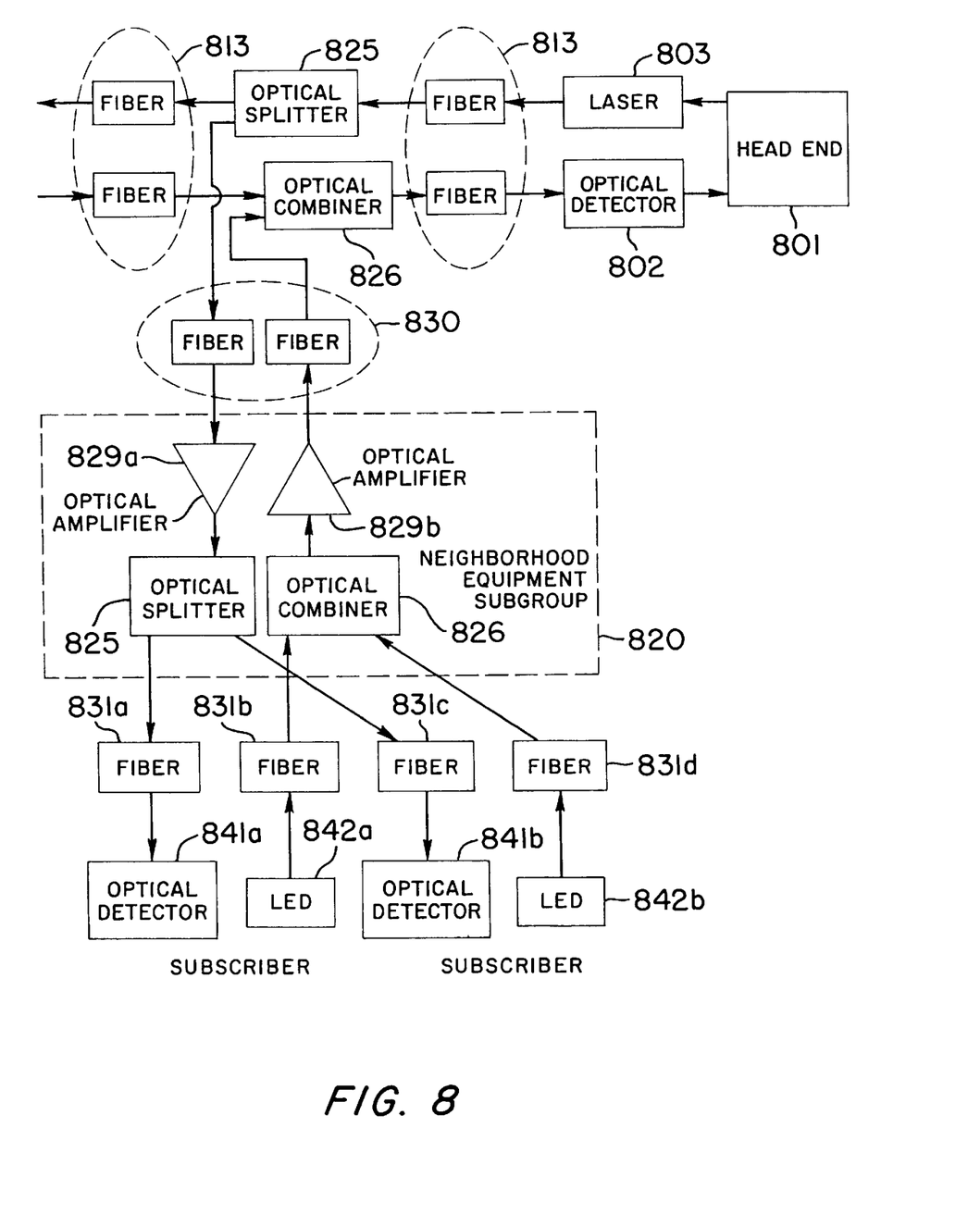
FIG. 8 shows a broadband two-way dual optical fiber equivalent implementation in accordance with the invention using non-coherent light sources in the return path and using corresponding optical detectors such as that of FIG. 5B.

FIG. 8 illustrates how those networks shown in FIGS. 6 and 7 are implemented equivalently, in accordance with the invention, in a broadband optical all-fiber network. In FIG. 8, as is known, central office switching center or head end 801 transmits and receives optical signals via laser 803 and detector 802 over fiber duplex lines 813; signals are transmitted to and received from subscriber subgroups from the neighborhood equipment 820 over duplex fiber lines 830, which are concentrated and dispersed respectively by optical combiner 826 and splitter 825.

In the neighborhood equipment subgroup 820, neighborhood subscribers receive broadband forward signals (optically amplified by amplifier 829a) via splitter 825 and subscriber return signals are combined by combiner 826 and amplified for return transmission by optical amplifier 829b.

Further, each subscriber is connected to its respective shared neighborhood equipment subgroup 820 via fiber duplex lines 831a, b and 831c, d and so on. Each subscriber has an optical detector 841 on the receive side and an LED source 842 on the transmit side.

It has been mentioned that an object of the invention is to use fiber-optic cable in the entire broad band network rather than just a part of it, since this provides greater transmission bandwidth for customer services at lower transmission cost.

Conventional applications of optical transmission to CATV are limited to sections of the network that are point-to-point. This ignores two key sections of the network: the section of the downstream network that is point-to-multipoint, and the section of the upstream network that is multipoint-to-point. The use of optical point-to-point transmission links can be of economic benefit but this limited use fails to take advantage of the enhanced bandwidth that is characteristic of fiber optics.

For example, as shown in FIG. 6 and 7, the combined telephoney CATV signal could be optically transmitted from the head-end location to the main station 701. At this point, the signal would be converted to electrical form and distributed further over the coaxial cable point-to-multipoint network to the plurality of subscriber locations. This arrangement limits the transmission bandwidth from the head-end to a subscriber to the capability of coaxial cable.

Further, in a conventional fiber system, it is sometimes envisioned that optical transmission could be used from the main station 701 back to the head end. The input signal to the optical link would be derived from the separate electrical multipoint-to-point section of the network connecting the plurality of subscribers to main station 701. Actually, in most conventional CATV systems, there is little or no use made of upstream bandwidth, and optical transmission is not implemented upstream. Upstream transmission is of course essential to a broadband system that combines telephony with CATV.

However, according to the invention, optical transmission is used for upstream subscriber-to-switch transmission, downstream switch-to-subscriber transmission, or both as in FIG. 8. This provides greater bandwidth for conventional CATV, telephony, and new interactive subscriber services.

For the multipoint-to-point optical transmission path in the upstream direction, in order to supply the necessary separate modulated optical signal at each subscriber location at low cost, according to the invention the optical source is an amplitude-modulated light-emitting diode rather than a more expensive laser. Because such a source typically produces an optical signal that is noncoherent, the outputs from a multiplicity of such sources may be combined without regard to the relative phases of the optical carriers.

Figure 9:
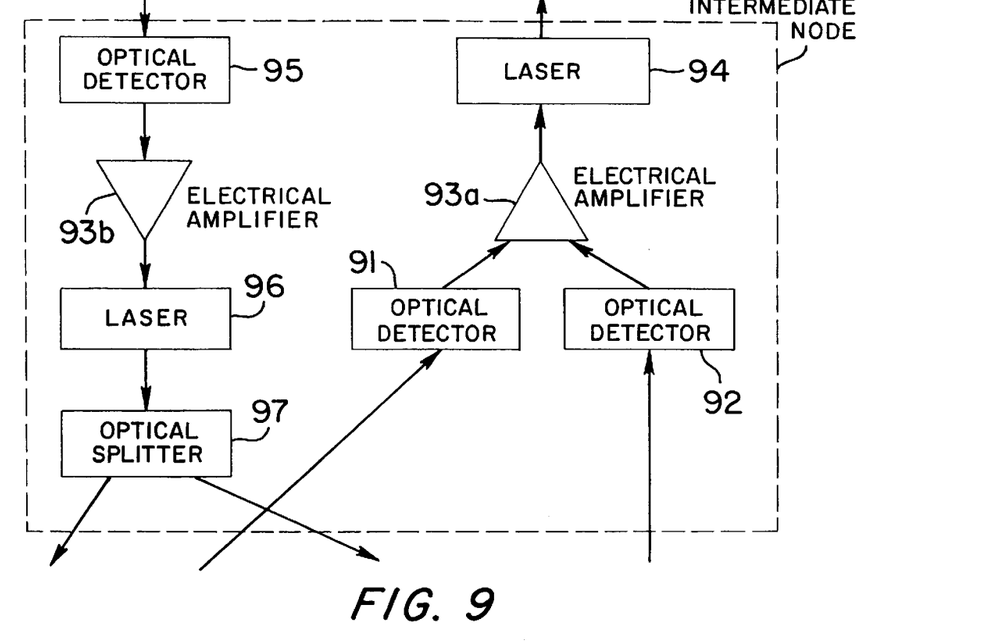
FIGS. 9 and 10 show alternative intermediate node (dropbox) configurations in accordance with the invention.

The combination of optical signals from a multiplicity of subscribers necessarily introduces a loss of signal power. Since a light-emitting diode has relatively limited output power, it is necessary to amplify an upstream optical signal at a node that is intermediate between the subscriber and the head end. At such a node, it is convenient to receive, combine, amplify and retransmit the upstream optical signals from several subscribers, using components that would be too expensive to provide for each subscriber. There may be further optical combination of upstream optical signals between the intermediate node and the head end. In order to take advantage of the greater bandwidth of fiber optic transmission, electrical signals generated by different subscribers and at different nodes may occupy different regions of the overall signal spectrum. The proposed system has three alternatives for processing at a node:

In the first alternative, as in FIG. 9, the upstream optical signals originating from several subscribers and received at an intermediate node are detected in the manner described at detectors 91, 92, and converted to electrical signals which are then combined electrically at amplifier 93a. The resulting electrical signal is converted to an amplified optical signal for transmission further upstream via laser 94. The gain may be provided electrically or by remodulation of an optical source of greater power. Since the intermediate node serves several subscribers, it is economically feasible to provide a laser as an optical source there. Downstream distribution is handled in an analogous fashion by detector 95, laser 96 and splitter 97.

Figure 10:
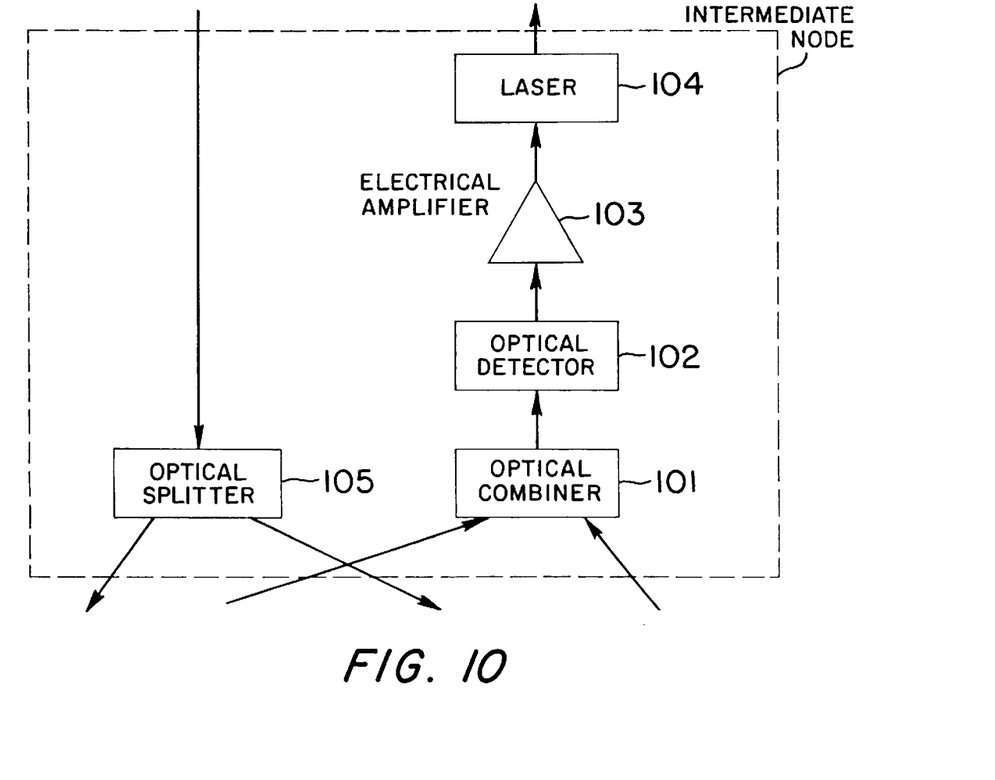

In the second alternative, in FIG. 10, upstream signals received at an intermediate node are combined optically in combiner 101 before undergoing conversion by detector 102 and electrical amplifier 103 to electrical form and reconversion to optical form with amplified power via laser 104.

In the third alternative, (shown in FIG. 2B) upstream signals remain in optical form from subscriber to head end. At an intermediate node, upstream signals from different subscribers are combined providing direct optical gain. An appropriate device to provide optical gain is an erbium-doped fiber amplifier. Such a device can provide gain throughout a 30 nanometer range at a wavelength of 1550 nanometers. This adequately covers the optical spectrum produced by a typical light-emitting diode.

For the point-to-multipoint optical transmission path in the downstream direction, it is feasible to provide a relatively expensive laser transmitter and thus overcome whatever signal losses occur in splitting the signal for transmission to the separate subscriber locations. Relatively simple and low-cost detectors should be used at those locations. Thus, although the cost of a more complex modulation technique could be afforded at the head end, a simple technique such as amplitude modulation is preferred.

In order to take advantage of the broad fiber-optic transmission bandwidth, it is preferable to avoid converting the signal to electrical form in the downstream path. Ideally, the only processing at an intermediate node in the downstream optical signal path should be to split the signal for distribution to separate subscribers. If it is also necessary to amplify the downstream signal at the intermediate node, an erbium-doped fiber amplifier would be appropriate.

What is claimed is:

1. A broadband optical fiber network for connecting subscribers to a head end for provision to said subscribers of broadband video, information and voice communications services, said head end including switching facilities for providing switched voice telephony service and central office functions among such subscribers, said network comprising:

a) a group of first upstream optical transmission segments, each of which is associated with a particular subscriber location, b) a source of non-coherent light at each subscriber location for translating electrical signals originating from said subscriber location into a broadband optical signal and for coupling said broadband optical signal to the associated first upstream optical transmission segment, the broadband optical signals originating from the subscriber locations encompassing the same optical band and the electrical signals at each of the subscriber locations being a frequency division multiplexed signal carried within a vestigial sideband signal, c) a group of second upstream optical transmission segments, d) a first means for optically combining the signals of said first upstream optical transmission segments into said group of second upstream optical transmission segments, e) a third upstream optical transmission segment, and f) a second means for optically combining the signals carried by each second upstream optical transmission segment into said third upstream optical transmission segment, said third upstream optical transmission segment connecting said second combining means to said head end.

2. The network of claim 5 further comprising:

g) a source of coherent light for generating modulated light signals representing source signals originating at the head end, h) a first downstream optical transmission segment, i) a first group of a plurality of second downstream optical transmission segments, j) a first signal separation means for splitting signals from said first downstream optical transmission segment to each said second downstream optical transmission segment in said first group, k) a second group of third downstream optical transmission segments, l) a second signal separation means for splitting signals from each of said second downstream optical transmission segments in said first group to each said third downstream optical transmission segment in said second group, each said third downstream optical transmission segment being associated with a single subscriber.

3. The network of claim 2 further including a first optical detector at each subscriber location for converting the optical modulated light signal carried by the associated third downstream optical transmission segment into electrical signals.

4. The network of claim 3 further including amplification means for amplification of the optical signal carried by said second downstream optical transmission segments.

5. The network of claim 4 further including an intermediate node for co-location of said amplification means and said second signal separation means.

6. The network of claim 1 further including amplification means for amplification of the optical signals carried by each of said second upstream optical transmission segments.

7. The network of claim 6 wherein said amplification means and said first optical combiner means are co-located at an intermediate node.

8. The network of claim 7 further including an optical detector for translating the optical signals present on said third upstream optical transmission segment into electrical signals and providing said electrical signals to said head end.

* * * * *

UNITED STATES PATENT AND TRADEMARK OFFICE
CERTIFICATE OF CORRECTION

PATENT NO. : 5,861,966
DATED : January 19, 1999
INVENTOR(S) : William G. Ortel

It is certified that error appears in the above-identified patent and that said Letters Patent is hereby corrected as shown below:

Column 5, line 60, delete "6110" and insert --610--.
Claim 2, line 1, delete "5" and insert --1--.

Signed and Sealed this

Thirty-first Day of August, 1999

Attest:

Q. TODD DICKINSON

*Attesting Officer*   Acting Commissioner of Patents and Trademarks